T. ROWE.
LAWN MOWER.
APPLICATION FILED JUNE 23, 1908.
905,591.
Patented Dec. 1, 1908.
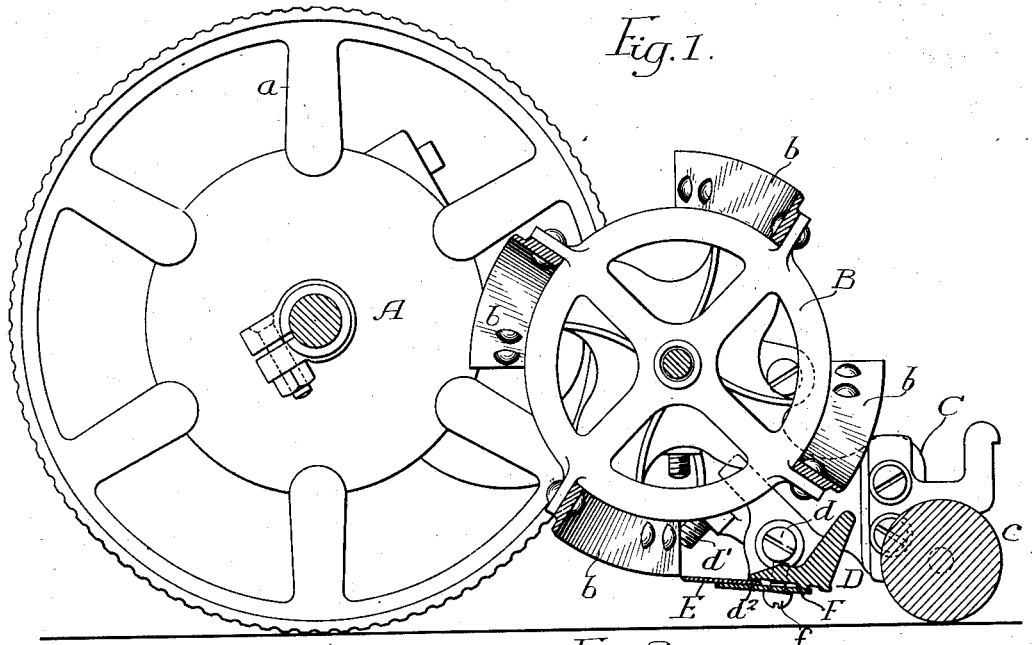
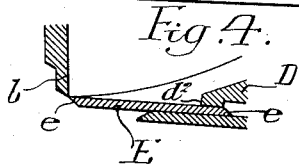
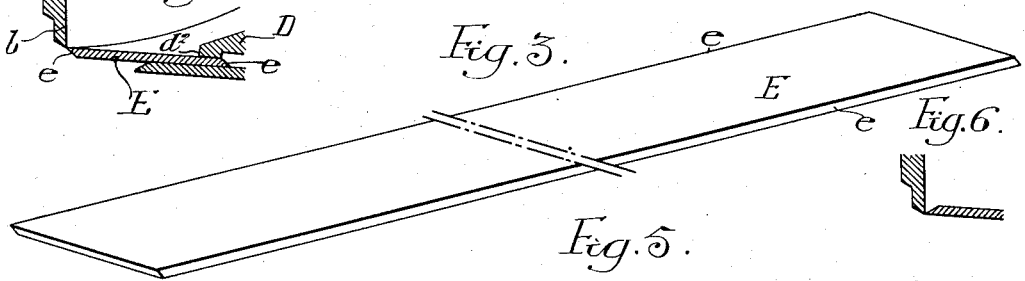
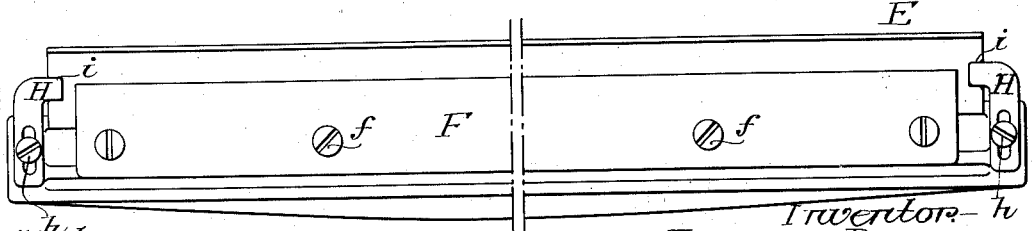
Witnesses:
William H. Rivoir.
Willa A. Burrowes.
Inventor:
Thomas Rowe.
by his Attorneys
Howson & Howson

UNITED STATES PATENT OFFICE.

THOMAS ROWE, OF WYNNEWOOD, PENNSYLVANIA.

LAWN-MOWER.

No. 905,591.          Specification of Letters Patent.          Patented Dec. 1, 1908.

Application filed June 23, 1908. Serial No. 439,972.

*To all whom it may concern:*

Be it known that I, THOMAS ROWE, a citizen of the United States, residing in Wynnewood, Pennsylvania, have invented certain Improvements in Lawn-Mowers, of which the following is a specification.

The object of my invention is to improve the construction of the cutting mechanism of a lawn mower so that it will cut more evenly and can be shifted or replaced when it is necessary to renew the cutting edge.

Referring to the accompanying drawing:—Figure 1, is a transverse sectional view of an ordinary form of lawn mower illustrating my invention; Fig. 2, is a plan view of the lower blade and its carrier detached; Fig. 3, is a perspective view of my improved blade; Fig. 4, is an enlarged diagrammatic sectional view; Fig. 5, is a view of a modification; and Fig. 6, is a diagrammatic view showing the action of the worn blade.

A is the main shaft of a lawn mower and $a$ is one of the traction wheels.

B is a rotary knife having blades $b$.

D is the fixed knife carrier pivoted at $d$ to the side frame C and this knife carrier can be adjusted by screws $d'$ in the ordinary manner so as to bring the knife in cutting relation to the blades $b$.

$c$ is the roller mounted at the rear end of the frame C.

The above described mechanism is common in this type of lawn mower. My invention relates particularly to the fixed blade or knife and the mechanism devised is for attaching the blade to the carrier D. In lawn mowers as at present constructed the blades wear away very rapidly and it is impossible to adjust them so as to bring them up to the true cutting position and enable the lawn mower to operate without undue friction and properly cut the grass.

Mounted on the carrier D is a blade E beveled at both edges $e$, $e$, as shown in Figs. 3 and 4. This blade is clamped between a projection $d^2$ on the carrier D and a plate F confined to the carrier by a series of screws $f$. The plate can be of any width desired and is preferably of such width that it will allow a certain proportion of the blade E to overhang as shown, and the blade E is made very thin and of high tempered steel so that it will have a certain amount of spring, allowing it to bear against the blades $b$ with a yielding pressure.

The blade is simply a straight blade extending from one side of the lawn mower to the other and is beveled at both edges and, as shown in Fig. 3, the bevel of the cutting edge is on the lower side of the blade so as to present to the knives a sharp edge and there will be practically no surface against which the blades $b$ must rub.

As soon as the blade E commences to wear and produce a friction surface, as shown in the diagram, Fig. 6, it can be inverted or turned edge for edge, as desired.

The screws of the clamp do not pass through the blade as in lawn mowers of the usual construction so that the blades can be carried in stock and readily applied when the one in use is completely worn away.

The blade E can be set on the carrier so that its inner edge will rest against the screws $f$, thus alining the blade properly with the carrier, but this is not absolutely essential.

In some instances where alinement is desired, especially on large lawn mowers, I preferably notch the blade E at $i$ at each end and provide slides H having projections which enter the notches. The slides are secured to the frame by screws $h$ which pass through slots in the slides. By adjusting the slides the blade E can be brought into proper alinement with the blades $b$ and then clamped by the screws $f$ and the plate F.

I claim:—

1. The combination in a lawn mower, of a rotating knife having a series of blades, a fixed carrier mounted in close proximity to the rotating knife, a blade made of spring metal and having a beveled edge, and a clamp for securing the blade firmly to the carrier throughout its length, said blade extending beyond the clamp and carrier a sufficient distance to allow it to bear against the blades of the rotating knife with a yielding pressure.

2. The combination in a lawn mower, of a rotating knife having a series of blades, a fixed carrier, a thin blade beveled at both edges, a clamp plate, and screws for clamping the blade to the carrier, said screws passing through the clamp plate and clear of the blade.

3. The combination in a lawn mower, of a rotating knife having a series of blades, a fixed carrier, a thin knife blade beveled on the cutting edge, a clamp plate, screws for clamping the knife blade to the carrier, said blade being notched at each end, and slides adjustably secured to the carrier and entering the notches in the blade.

4. A flat knife blade for a lawn mower made of spring metal having both edges beveled and notched at each end.

In testimony whereof, I have signed my name to this specification, in the presence of two subscribing witnesses.

THOMAS ROWE.

Witnesses:
  Jos. H. Klein,
  Wm. A. Barr.